US005810526A

United States Patent [19]

Hirai

[11] Patent Number: 5,810,526

[45] Date of Patent: Sep. 22, 1998

[54] LUBRICANT APPLICATION APPARATUS IN A GRAVURE ENGRAVING MACHINE

[75] Inventor: Keisuke Hirai, Kyoto, Japan

[73] Assignee: Dainippon Screen Mfg. Co., Ltd., Japan

[21] Appl. No.: 679,629

[22] Filed: Jul. 12, 1996

[30] Foreign Application Priority Data

Jul. 18, 1995 [JP] Japan .................................... 7-181744

[51] Int. Cl.[6] ........................................................ B23C 3/00

[52] U.S. Cl. .............................. 409/131; 72/81; 409/136; 409/165

[58] Field of Search .................................... 409/131, 132, 409/135, 136, 165, 199; 72/76, 81

[56] References Cited

U.S. PATENT DOCUMENTS

| | | | |
|---|---|---|---|
| 1,695,617 | 12/1928 | Teissere et al. | 72/81 |
| 2,224,335 | 12/1940 | Billker et al. | 409/136 |
| 3,292,403 | 12/1966 | Lewis | 72/81 |
| 4,830,552 | 5/1989 | Ryf | 409/103 |
| 4,830,553 | 5/1989 | Abeyta et al. | 409/136 |

FOREIGN PATENT DOCUMENTS

| | | |
|---|---|---|
| 326121 | 4/1991 | Japan . |

OTHER PUBLICATIONS

Tiefdruck heute, pp. 150/161, VEB Fachbuchverlag, Leipzig, 1976.

*Primary Examiner*—Daniel W. Howell
*Attorney, Agent, or Firm*—Ostrolenk, Faber, Gerb & Soffen, LLP

[57] ABSTRACT

Apparatus for and method of automatically applying a lubricant to a gravure cylinder set in an gravure engraving machine. With a rotational drive mechanism of the gravure engraving machine biased to cause the gravure cylinder to be under rotation, a lubricant is discharged to and spread on the surface of the gravure cylinder. The lubricant application apparatus is moved axially of the gravure cylinder. Accordingly, the surface of the gravure cylinder is scanned such that the lubricant is applied onto the whole surface of the gravure cylinder. To move the lubricant application apparatus, an engraving head moving mechanism of the gravure engraving machine can be utilized.

17 Claims, 13 Drawing Sheets

LUBRICANT APPLICATION APPARATUS IN A GRAVURE ENGRAVING MACHINE

BACKGROUND OF THE INVENTION

1. Field of the Invention

The present invention relates to apparatus for and method of applying a lubricant to a gravure cylinder set in a gravure engraving machine, and also to a gravure engraving machine having a lubricant application mechanism.

2. Description of Related Art

A gravure engraving machine is arranged to prepare a printing plate by engraving a gravure cylinder for gravure printing. At the time of engraving, the gravure cylinder is rotated around the axis thereof at a constant rotational speed. An engraving head movable axially of the gravure cylinder is disposed opposite thereto. The engraving head has a diamond bite called a stylus for forming cells in the surface of the gravure cylinder which is under rotation. The stylus is to be vibrated at frequency of several kHz. The amplitude of the stylus is controlled according to an image signal. This results in formation of cells having sizes and depth (volume) according to image signals.

The amplitude of the stylus is about ±30 μm, and the maximum cell depth is about 50 μm. On the other hand, the amount of rotational deflection of the gravure cylinder is about dozens μm. More specifically, the gravure cylinder preferably has high roundness, but may actually have, in the surface thereof, concave and convex portions. This results in deflection of the surface of the gravure cylinder opposite to the stylus. To form cells having accurate sizes, it is required to move the engraving head according to the rotational deflection of the gravure cylinder.

Japanese Patent Publication (KOKOKU) No. 3-26123 which is a counterpart of U.S. patent application Ser. No. 56623 discloses a mechanism for maintaining the distance between the engraving head and the cylinder surface at a predetermined value. More specifically, the engraving head has a shoe arranged to come in slide contact with the surface of the gravure cylinder. The engraving head is normally biased toward the cylinder such that the shoe comes in contact with the cylinder surface. This maintains the distance between the engraving head and the cylinder at a predetermined distance determined by the shoe.

However, since the shoe comes in contact with the cylinder, there is a possibility of the cylinder surface being damaged. Particularly, after burrs have been generated by engraving, the shoe cannot smoothly slide on the cylinder surface.

To overcome the problem above-mentioned, a lubricant is applied to the cylinder surface for smoothing the slide movement of the shoe. Conventionally, such a lubricant is manually applied. That is, the operator applies a lubricant onto the cylinder surface using waste cloth or the like after a gravure cylinder has been set in the gravure engraving machine.

Such a manual application of a lubricant makes relatively intricate a preparatory work before engraving.

Further, to accomplish full automation of engraving of plural gravure cylinders by automating the replacement of the gravure cylinders, it is also required to automate the application of a lubricant. Thus, the automation of the application of a lubricant is the object to be achieved for automating the operation of a gravure engraving machine.

SUMMARY OF THE INVENTION

It is a first object of the present invention to provide a lubricant application apparatus capable of automatically applying a lubricant onto a gravure cylinder set in a gravure engraving machine.

It is a second object of the present invention to provide a gravure engraving machine having an arrangement for automatically applying a lubricant onto a gravure cylinder.

It is a third object of the present invention to provide a method of applying a lubricant to a gravure cylinder set in a gravure engraving machine.

According to the lubricant application apparatus of the present invention, discharging means for discharging a lubricant to the surface of a gravure cylinder and spreading means for spreading the discharged lubricant on the surface of the gravure cylinder, are displaced toward and away from the gravure cylinder by drive means. Thus, by bringing the discharging means and the spreading means close to the gravure cylinder to discharge and spread a lubricant, the lubricant can be applied onto the surface of the gravure cylinder. At this time, when the gravure cylinder is caused to be under rotation by a rotational drive mechanism of the gravure engraving machine, the lubricant can be applied onto the whole circumferential surface of the gravure cylinder. When, with the gravure cylinder being under rotation, the discharging means and the spreading means are moved axially of the gravure cylinder by moving means, a lubricant can automatically be applied onto the surface of the gravure cylinder while the cylinder surface is being spirally scanned.

According to an embodiment of the present invention, the spreading means comprises: a sheet member housed as wound on a feed roll; contact means for bringing a pulled-out portion of the sheet member into contact with the surface of the gravure cylinder; and takeup means for winding a used portion of the sheet member.

According to the arrangement above-mentioned, the sheet member is reeled out from the feed roll and brought into contact with the surface of the gravure cylinder. A used portion of the sheet member is wound by the takeup means. Therefore, a lubricant can be spread on the surface of the gravure cylinder using an unused portion of the sheet member which is successively reeled out. Preferably, the sheet member has the property of absorbing the lubricant. When such a sheet member is used, a surplus lubricant on the surface of the gravure cylinder can be wiped off.

The takeup means may comprise: a holding member for holding a takeup roll for winding a used portion of the sheet member thereon; and a takeup mechanism for rotating the holding member in the winding direction in association with the drive of the discharging means and the spreading means by the drive means.

According to the arrangement above-mentioned, when the discharging means and the spreading means are moved toward and away from the gravure cylinder, a used portion of the sheet member is wound, in association with such a movement, on the takeup roll. This eliminates a special drive mechanism for winding the sheet member.

The drive means may comprise a movable unit which is movable toward and away from the gravure cylinder and which holds the discharging means and the spreading means. In such an arrangement, it is preferred that the takeup mechanism is arranged to rotate the holding member per stroke during which the movable unit is moved toward and then away from the gravure cylinder, and that the takeup mechanism comprises rotational amount regulating means for decreasing, according to a decrease in diameter of the feed roll, the rotational amount of the holding member per stroke.

According to the arrangement above-mentioned, the holding member which holds the takeup roll, is decreased in rotational amount with a decrease in diameter of the feed roll. Thus, the takeup amount of a used portion of the sheet member can be maintained substantially constant regardless of the diameter of the takeup roll. Accordingly, since an unused portion of the sheet member is reeled out from the feed roll substantially in a predetermined amount at all times, the lubricant can always be spread using such an unused portion of the sheet member. Further, the sheet member can be reeled out neither too much nor too less to prevent the sheet member from being wastefully used.

The takeup mechanism may comprise a takeup lever connected to the holding member through a one-way clutch such that only the rotation in the winding direction is transmitted to the holding member, and takeup lever drive means for swinging the takeup lever during one stroke during which the movable unit of the drive means is moved toward and then away from the gravure cylinder. In such an arrangement, the rotational amount regulating means may comprise a sheet feed control member which includes a roll contact portion to come in contact with the feed roll and a rotation regulating portion to come in contact with the takeup lever, which is disposed in a manner rotatable around an axis substantially parallel with the axis of the feed roll, and which is arranged to regulate the swing width of the takeup lever according to the diameter of the feed roll.

According to an embodiment of the present invention, the discharging means and the spreading means are integrally or simultaneously displaced by the drive means, the contact portion of the spreading means is finely movable toward and away from the gravure cylinder, the discharging means comprises a head portion movable to come in contact with the gravure cylinder, and the spreading means comprises bias means for resiliently biasing the contact portion such that the contact portion is located in a position nearer to the gravure cylinder than the head portion of the discharging means. Preferably, the drive means is arranged to drive the discharging means and the spreading means to provide any of three states, i.e., a first state where neither the head portion of the discharging means nor the contact portion of the spreading means is in contact with the gravure cylinder, a second state where the contact portion is in contact with the gravure cylinder and the head portion is not in contact with the gravure cylinder, and a third state where the contact portion is pushed, against the resilient force of the bias means, by the gravure cylinder such that both the contact portion and the head portion are in contact with the gravure cylinder.

According to the arrangement above-mentioned, the contact portion of the spreading means is finely movable toward and away from the gravure cylinder and is normally located in a position nearer to the gravure cylinder than the head portion of the discharging means. Accordingly, by controlling the positions of the discharging means and the spreading means with respect to the gravure cylinder by the drive means, any of the first, second and third sates above-mentioned can be provided. At the first state, neither the head portion of the discharging means nor the contact portion of the spreading means is in contact with the gravure cylinder. Thus, the first state is a so-called waiting state. At the second state, only the contact portion of the spreading means is in contact with the gravure cylinder. Thus, the second state can be utilized, for example, for wiping off a surplus lubricant. At the third state, both the head portion of the discharging means and the contact portion of the spreading means are in contact with the gravure cylinder. Thus, a lubricant can be discharged and spread. Therefore, discharging and spreading a lubricant and wiping off a surplus lubricant can be effected using single drive means.

When the gravure engraving machine comprises an engraving head for engraving a gravure cylinder and an engraving head moving mechanism for moving the engraving head axially of the gravure cylinder, the lubricant application apparatus preferably further comprises a support mechanism for integrally supporting the discharging means and the spreading means together with the engraving head.

According to the arrangement above-mentioned, using an engraving head moving mechanism of the gravure engraving machine, the discharging means and the spreading means can be moved axially of the gravure cylinder. This eliminates the need for specially disposing moving means for moving the discharging means and the spreading means. It is sufficient to dispose the support mechanism for integrally supporting the discharging means and the spreading means together with the engraving head.

The gravure engraving machine according to the present invention comprises: an engraving head for engraving a gravure cylinder; an engraving head moving mechanism for moving the engraving head axially of the gravure cylinder; a rotational drive mechanism for rotating the gravure cylinder around the axis thereof; discharging means for discharging a lubricant to the surface of the gravure cylinder; spreading means for spreading the discharged lubricant on the surface of the gravure cylinder; drive means for displacing the discharging means and the spreading means toward and away from the gravure cylinder; and a support mechanism for integrally supporting the discharging means and the spreading means together with the engraving head.

According to the arrangement above-mentioned, when a lubricant is discharged and spread by the discharging means and the spreading means while the gravure cylinder is being rotated with the rotational drive mechanism biased, the lubricant can automatically be applied. When the discharging means and the spreading means are moved axially of the gravure cylinder, the lubricant can be applied onto the surface of the gravure cylinder while the cylinder surface is being ruster-scanned.

The lubricant application method according to the present invention comprises: a step of biasing a rotational drive mechanism of a gravure engraving machine to rotate a gravure cylinder; a step of discharging a lubricant from lubricant discharging means to the surface of the gravure cylinder; a step of spreading the discharged lubricant on the surface of the gravure cylinder by spreading means; and a step of moving the discharging means and the spreading means axially of the gravure cylinder.

According to the method above-mentioned, the lubricant discharging means and spreading means scan the whole surface of the gravure cylinder such that a lubricant can automatically be applied.

According to an embodiment of the present invention, the lubricant application method further comprises a step of bringing wiping means into contact with the surface of the gravure cylinder while the gravure cylinder is under rotation, and a step of moving the wiping means axially of the gravure cylinder.

According to the method above-mentioned, a surplus lubricant on the surface of the gravure cylinder can be wiped off.

Preferably, the lubricant discharging means is retreated from the surface of the gravure cylinder before the wiping means is brought into contact with the surface of the gravure cylinder.

Each of the spreading means and the wiping means may comprise a common arrangement comprising: a sheet member housed as wound on a feed roll; contact means for bringing a pulled-out portion of the sheet member into contact with the surface of the gravure cylinder; and takeup means for winding a used portion of the sheet member. In the arrangement above-mentioned, when bringing the wiping means into contact with the surface of the gravure cylinder, it is preferred that a used portion of the sheet member portion is wound by takeup means such that an unused portion of the sheet member comes in contact with the surface of the gravure cylinder.

These and other features, objects and advantages of the present invention will be more fully apparent from the following detailed description set forth below when taken in conjunction with the accompanying drawings.

BRIEF DESCRIPTION OF THE DRAWINGS

FIG. 13A and FIG. 13B are views illustrating the positional relationship between the lubricant application apparatus and the gravure cylinder, in which FIG. 13A shows the state where a lubricant is wiped off and FIG. 13B shows the state where a lubricant is applied;

DETAILED DESCRIPTION OF THE PREFERRED EMBODIMENTS

Figure 1:
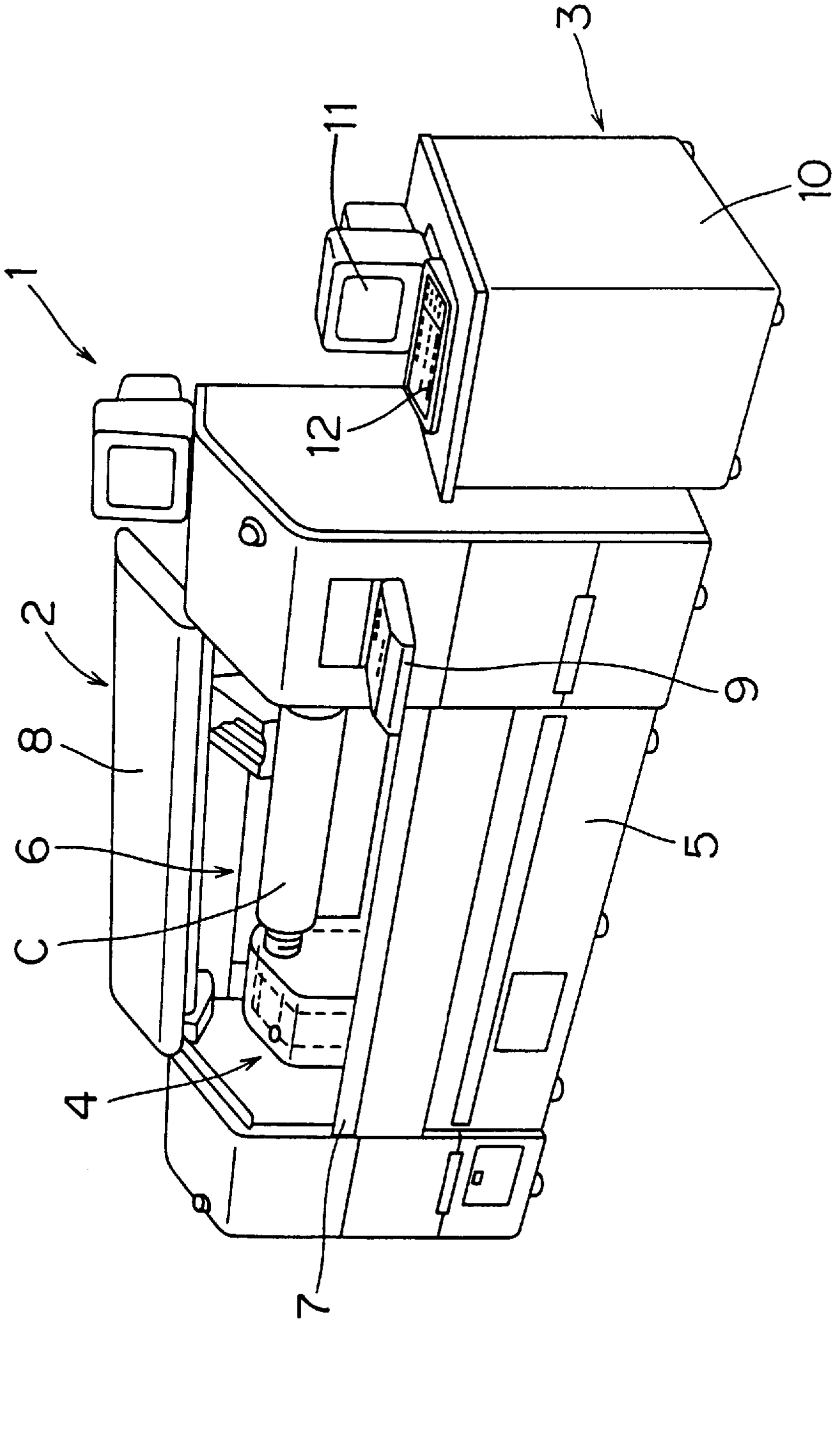
FIG. 1 is a perspective view of a gravure engraving machine incorporating a lubricant application apparatus according to an embodiment of the present invention.

FIG. 1 is a perspective view illustrating the appearance of a gravure engraving machine 1 incorporating a lubricant application apparatus according to an embodiment of the present invention. The gravure engraving machine 1 is constituted by an engraving unit 2 and a control unit 3 disposed at the side of the engraving unit 2. The engraving unit 2 has an engraving machine body 4 to be operated according to an instruction from the control unit 3. The engraving unit 2 has a cover 5, a slide cover 7 and a safety cover 8 for covering the engraving machine body 4. The slide cover 7 and the safety cover 8 are openable. When these covers 7 and 8 are opened, an opening 6 is formed. A gravure cylinder C can be inserted and removed through the opening 6. An operation panel 9 is disposed at the right hand of the cover 5.

The control unit 3 has a main control portion 10 including CPU, ROM, RAM and the like. A display 11 and a keyboard 12 are disposed on the main control portion 10.

Figure 2:
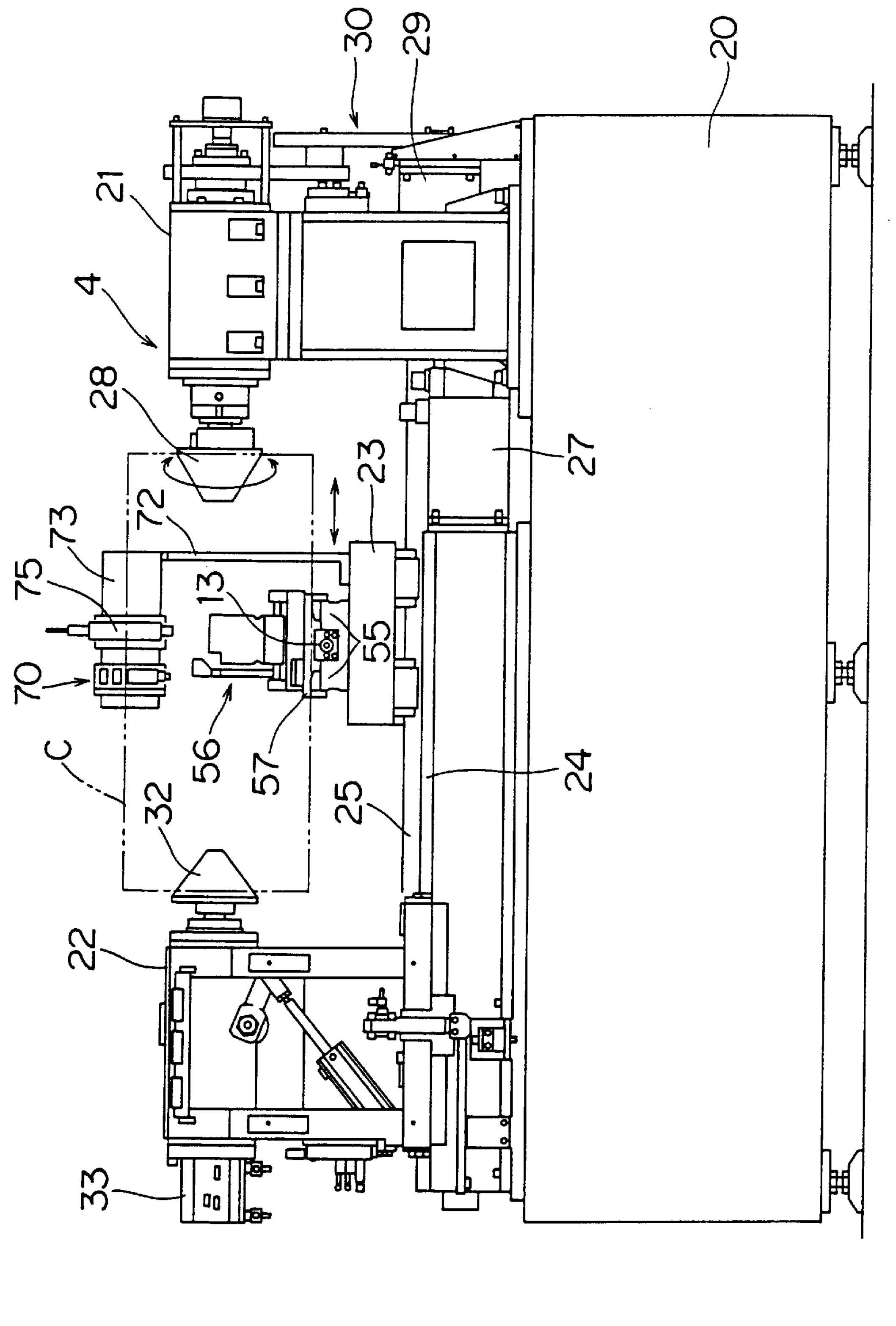
FIG. 2 is a front view of the gravure engraving machine.
Figure 3:
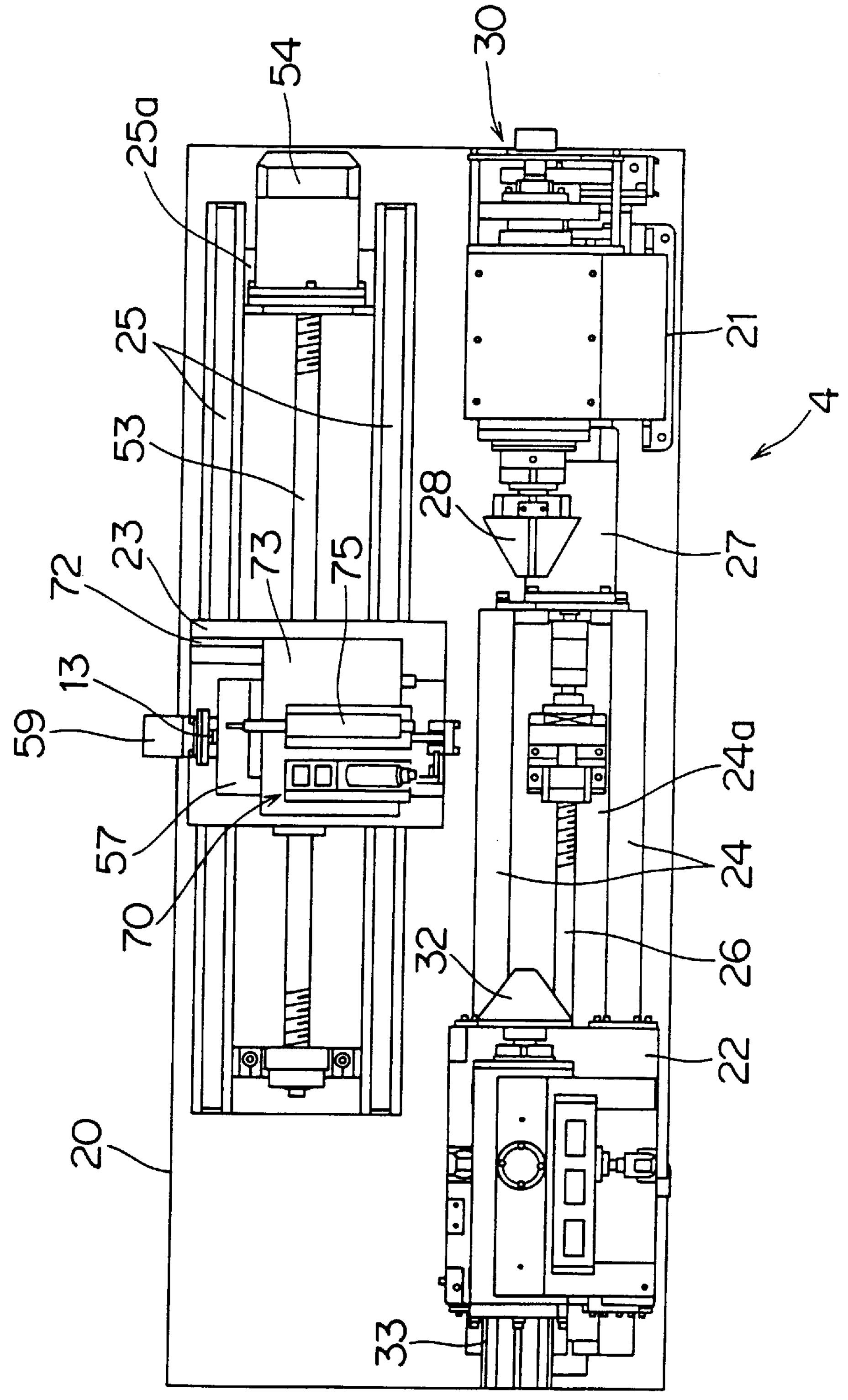
FIG. 3 is a plan view of the gravure engraving machine.
Figure 4:
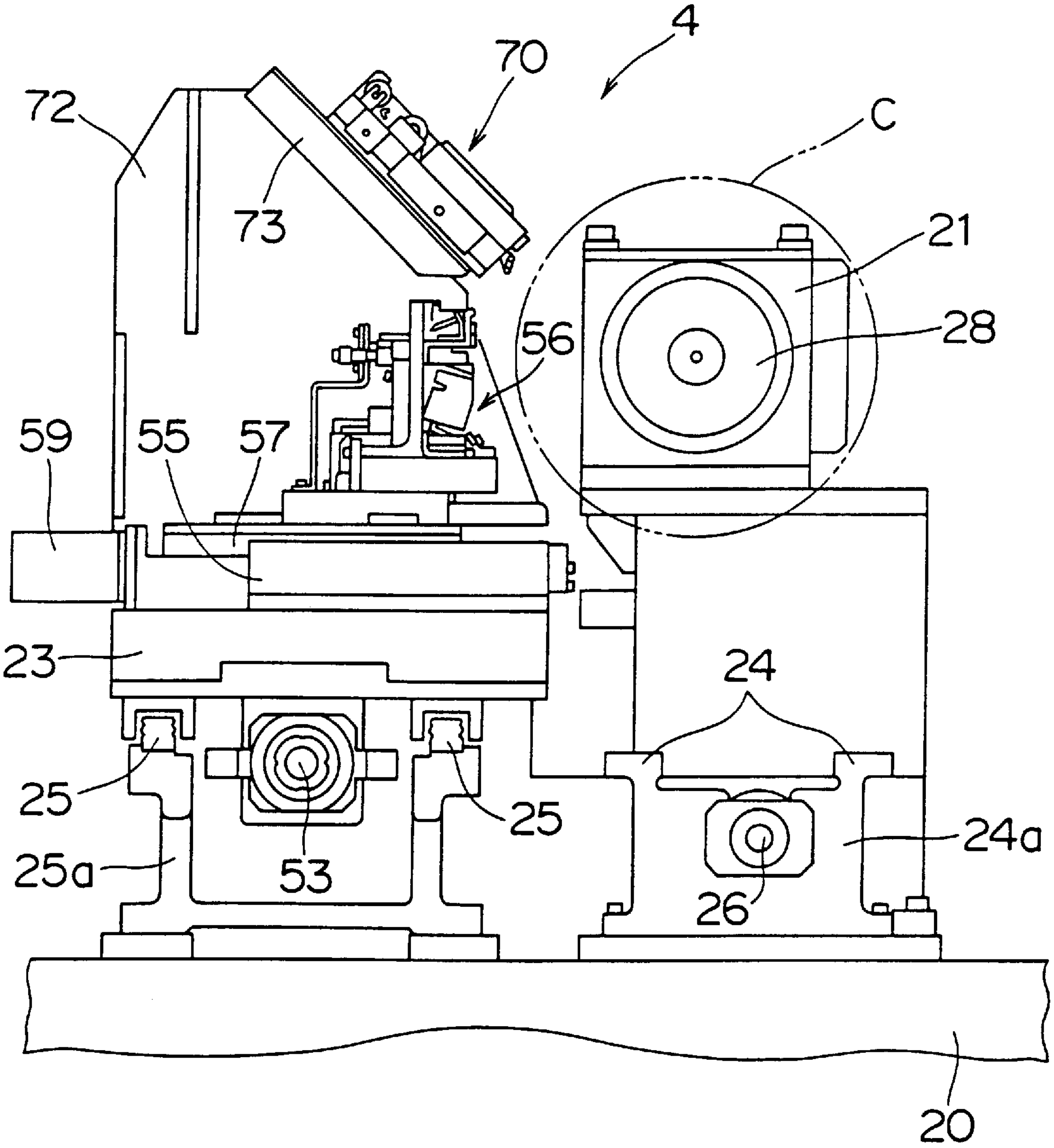
FIG. 4 is an enlarged side view of the portions of the gravure engraving machine.

The arrangement of the engraving machine body 4 is shown in more detail in FIG. 2 to FIG. 4. FIG. 2 is a front view of the engraving machine body 4, FIG. 3 is a plan view thereof and FIG. 4 is a left side view thereof with portions enlarged. The engraving machine body 4 is constituted by a bed 20, a head stock 21 secured to the top of the bed 20, a tail stock 22 (not shown in FIG. 4) opposite to the head stock 21, and an engraving table 23. Disposed on the top of the bed 20 are a pair of guide rails 24 for guiding the tail stock 22 and a pair of guide rails 25 for guiding the engraving table 23, these guide rails 24 and 25 being disposed in parallel to each other and extended transversely in FIG. 3. The guide rails 24 are formed on the tops of both the lateral sides of a rail stand 24*a* disposed on the bed 20 at front side thereof (at a lower side in FIG. 3). The guide rails 25 are formed on the tops of both the lateral sides of a rail stand 25*a* disposed on the bed 20 at its rear side (at an upper side in FIG. 3). At a lower portion of the tail stock 22, a ball thread 26 is disposed in parallel with and between the pair of guide rails 24. This ball thread 26 is threadedly connected to a nut portion (not shown) disposed at a lower portion of the tail stock 22. A tail stock drive motor 27 for driving the tail stock 22 is disposed at that end of the ball thread 26 which is closer to the head stock 21. When the tail stock drive motor 27 is driven, the ball thread 26 is rotated. This enables the tail stock 22 to be moved toward or away from the head stock 21.

A main spindle 28 is rotatably disposed at the center of the head stock 21. The main spindle 28 is to be rotated by a drive mechanism 30 including a belt and a main spindle drive motor 29 disposed at one end of the head stock 21.

A cone 32 is transversely movably and rotatably disposed at the center of the tail stock 22. A pneumatically operated cone cylinder 33 is mounted on the tail stock 22 at the back side thereof for transversely moving the cone 32. The tips of the main spindle 28 and the cone 32 are made in the form of a cone and opposite to each other. The gravure cylinder C is held by and between the main spindle 28 and the cone 32. According to the arrangement above-mentioned, the gravure cylinder C can be rotated by rotatingly driving the main spindle drive motor 29.

The engraving table 23 is movable along the guide rails 25 transversely in FIG. 3. A ball thread 53 is disposed between and in parallel with the pair of guide rails 25. Disposed at a lower portion of the engraving table 23 is a nut portion (not shown) threadedly connected to the ball thread 53. A counter-shaft motor 54 is secured to an end of the ball thread 53. By rotating the ball thread 53 by the counter-shaft motor 54, the engraving table 23 can transversely be moved along the guide rails 25. Thus, an engraving head moving mechanism includes the guide rails 25, the ball thread 53, and the counter-shaft motor 54.

A pair of guide rails 55 are disposed on the engraving table 23 and extend in a back-to-forth direction orthogonal to the guide rails 25. A head support stand 57 for swingingly supporting an engraving head 56 is movably mounted on the guide rails 55. A ball thread 13 is disposed between and in parallel with the pair of guide rails 55. A stepping motor 59 for rotating the ball thread 13 is disposed at an end thereof. A nut (not shown) to be threadedly connected to the ball thread 13 is secured to a lower portion of the head support stand 57. According to the arrangement above-mentioned, the engraving head 56 can be moved toward and away form the gravure cylinder C by driving the stepping motor 59.

Figure 5:
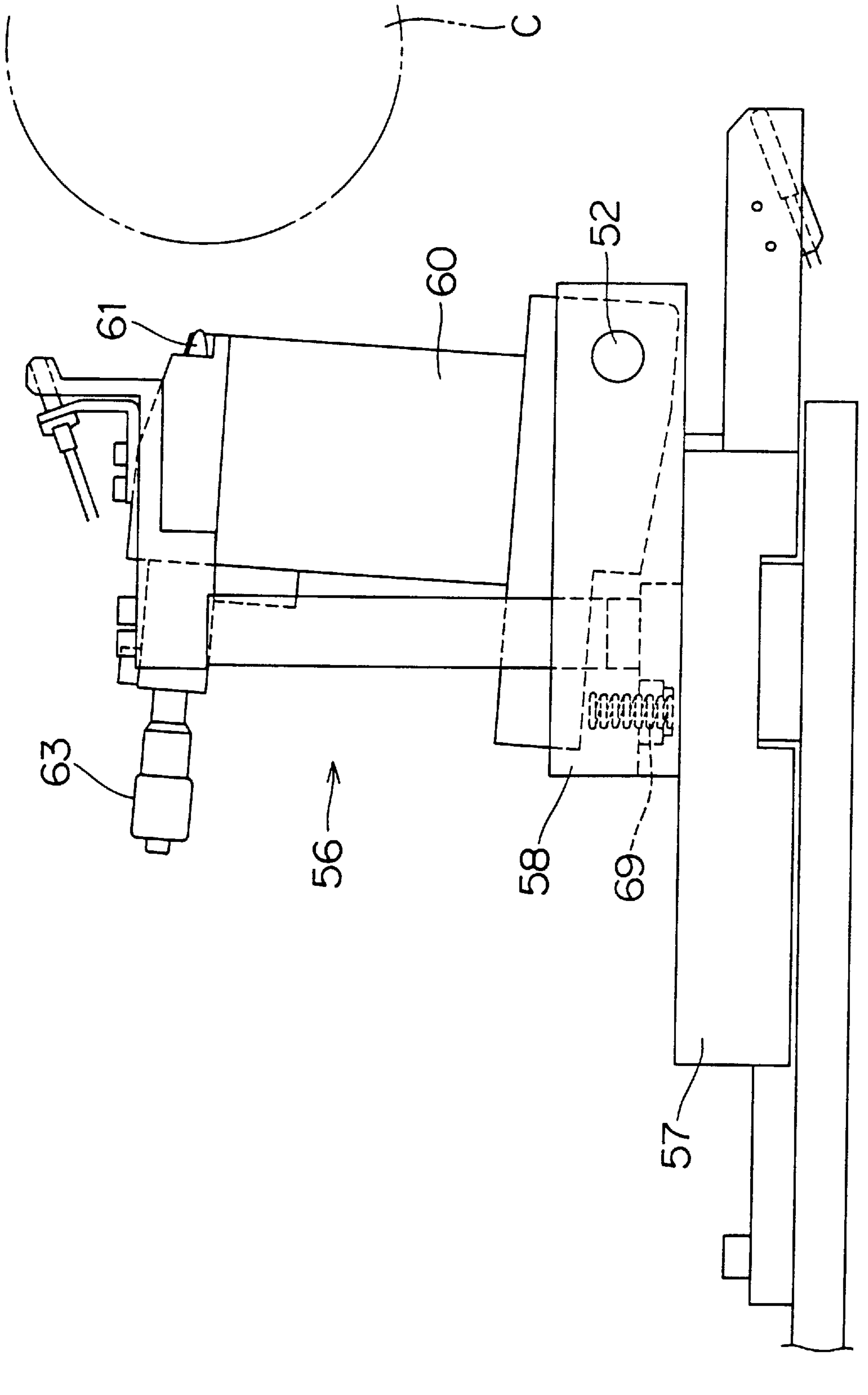
FIG. 5 is an enlarged side view illustrating the arrangement of the engraving head and the vicinity thereof of the gravure engraving machine.
Figure 6:
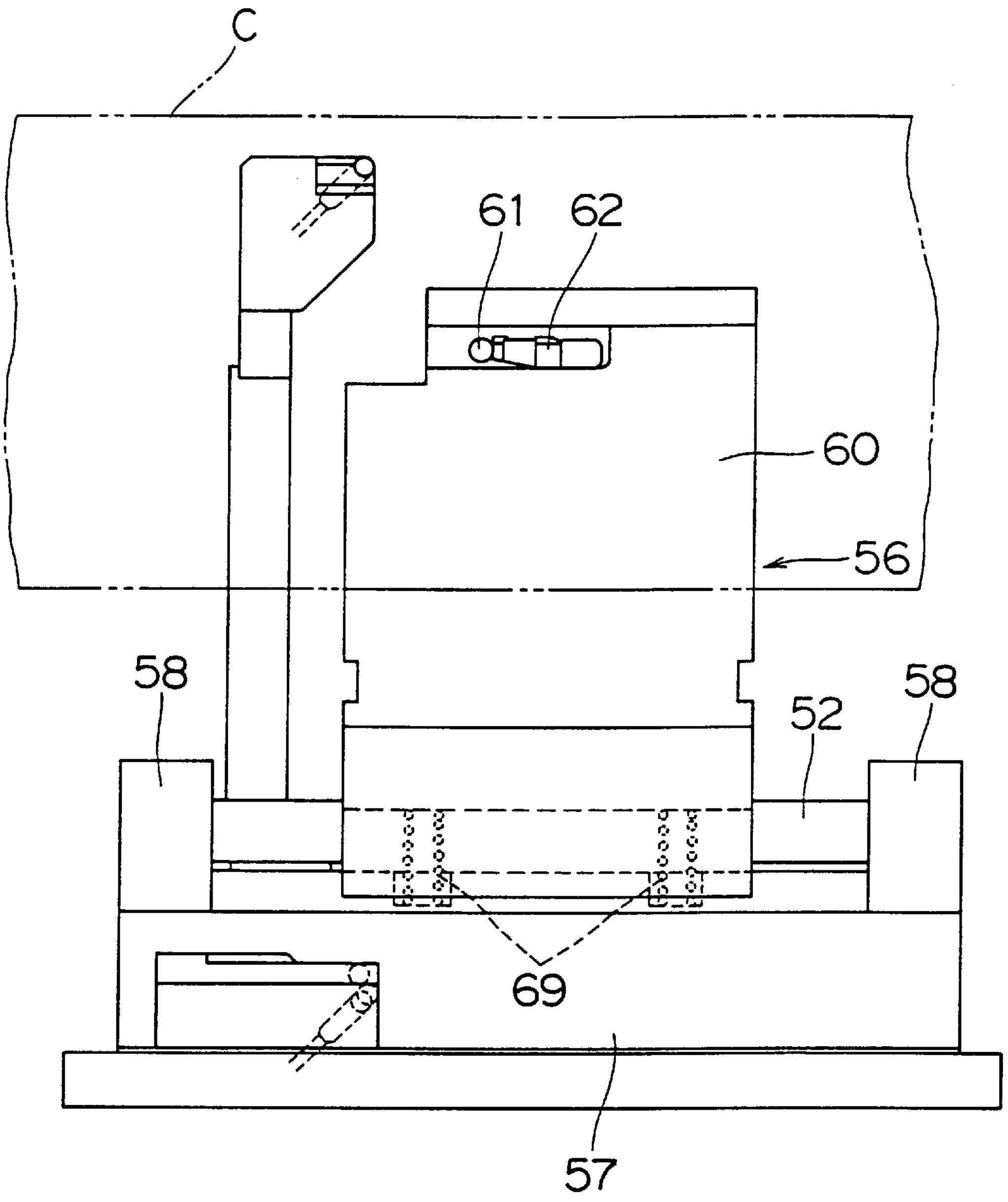
FIG. 6 is an enlarged front view illustrating the arrangement of the engraving head and the vicinity thereof of the gravure engraving machine.

As shown in FIGS. 5 and 6, a pair of left- and right-hand bearing portions 58 are disposed on the top of the head support stand 57. A swing shaft 52 is rotatably disposed at the tips (front ends) of the bearing portions 58. A head body 60 of the engraving head 56 is secured to the swing shaft 52. A spring 69 is disposed, as compressed, between the lower rear end of the head body 60 and the head support stand 57. A sliding shoe 61 and a stylus 62 are disposed at the front surface of the head body 60. The projecting length of the sliding shoe 61 can be adjusted by an adjusting screw 63 disposed at the rear surface of the head body 60. When engraving the gravure cylinder C under rotation while the stylus 62 is being vibrated, the sliding shoe 61 comes in contact with the cylinder C to maintain the distance between the engraving head 56 and the cylinder C at a predetermined value.

As shown in FIGS. 2 to 4, a lubricant application apparatus 70 according to an embodiment of the present invention is disposed above the engraving head 56. To discharge a lubricant onto the surface of the cylinder C, the lubricant application apparatus 70 is inclinedly disposed with the head thereof turned down toward the cylinder C. This lubricant application apparatus 70 is arranged to apply a lubricant onto the surface of the cylinder C before the cylinder C is engraved by the engraving head 56. An applied lubricant helps the sliding shoe 61 smoothly slide on the cylinder C.

A first support plate 72 is standing from the engraving table 23. The lubricant application apparatus 70 is fixed, through a mounting member 74 (to be discussed later), to a second mounting plate 73 which is fixed to the first support plate 72. Accordingly, when the engraving table 23 is slidably moved, the lubricant application apparatus 70 is moved axially of the cylinder C.

Disposed beside the lubricant application apparatus 70 is a camera 75 for monitoring cells formed in the surface of the cylinder C. This camera 75 is also attached to the second mounting plate 73.

Figure 7:
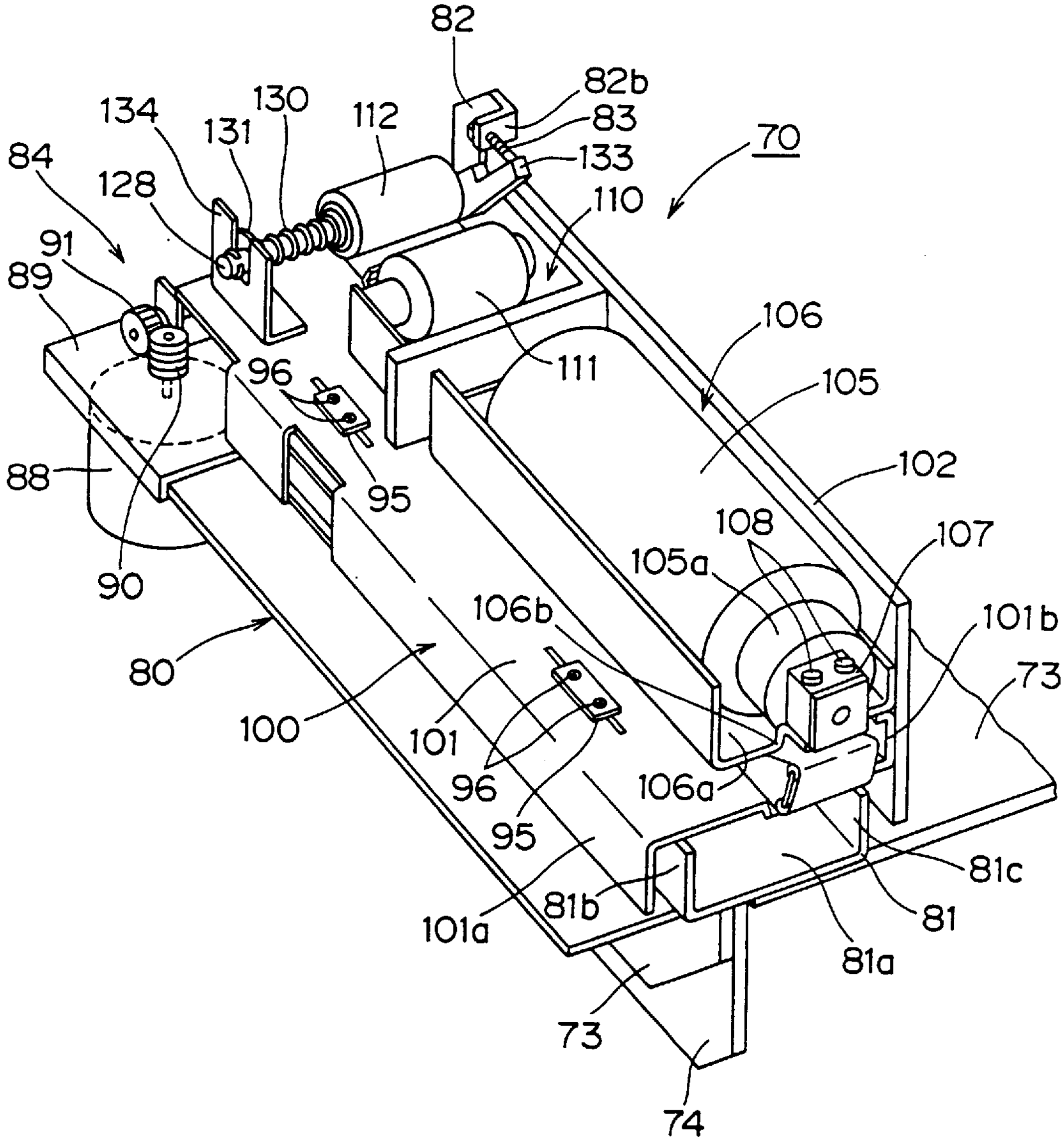
FIG. 7 is a perspective view of the lubricant application apparatus.
Figure 8:
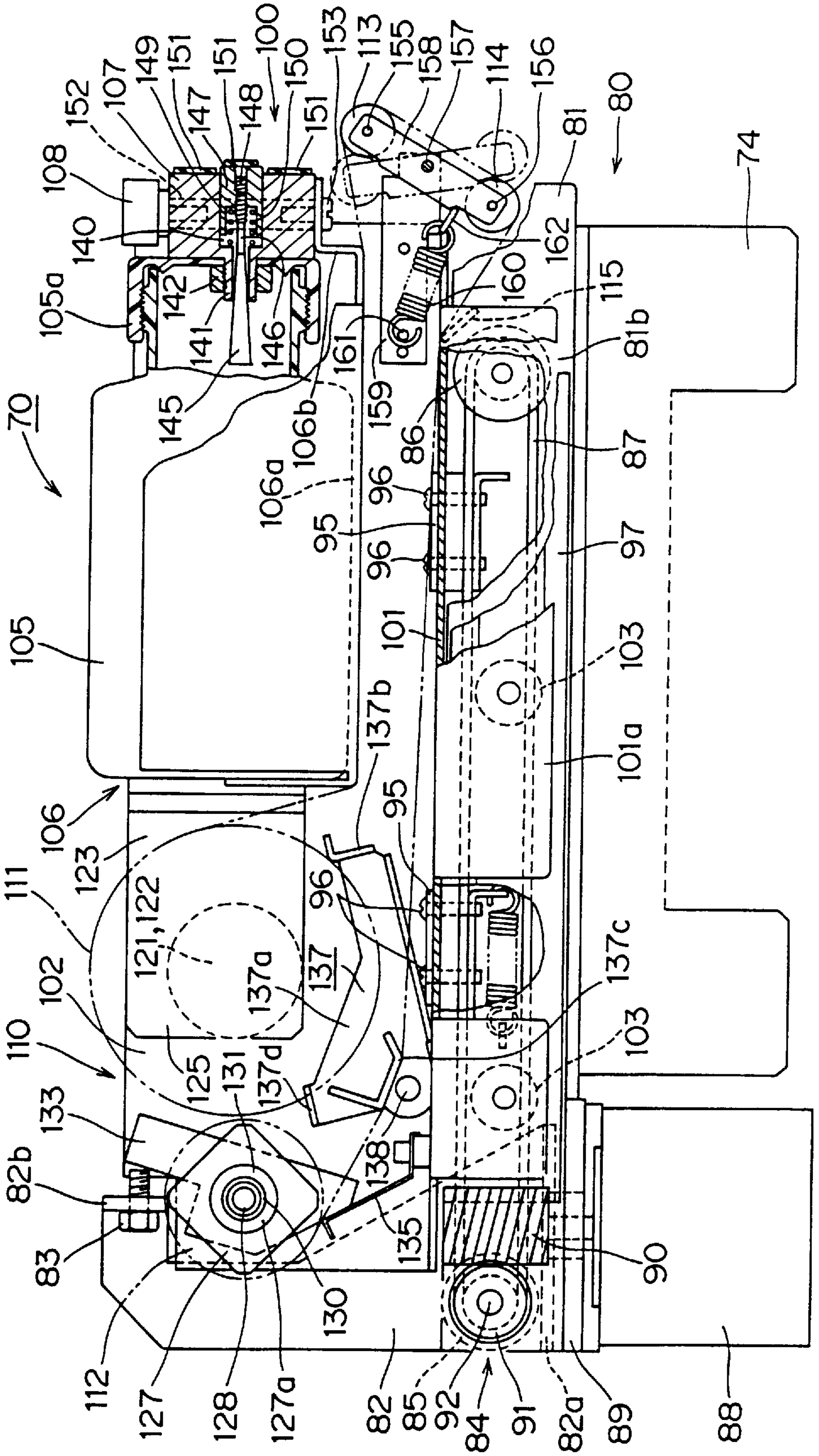
FIG. 8 is a side view, with portions broken away, of the lubricant application apparatus.
Figure 9:
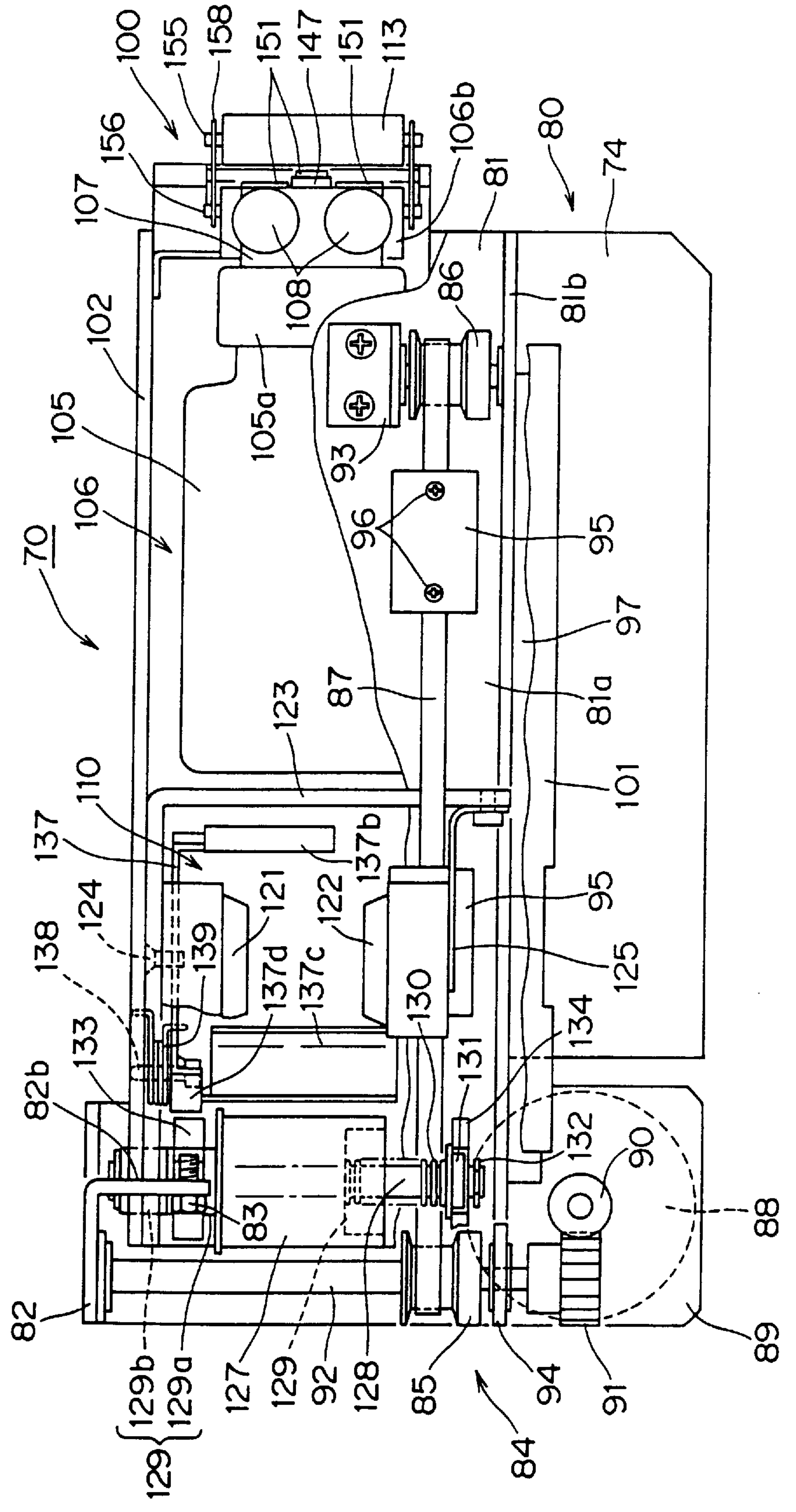
FIG. 9 is a plan view, with portions broken away, of the lubricant application apparatus.

FIG. 7 is a perspective view of the lubricant application apparatus 70, FIG. 8 is a section view, with portions broken away, of the apparatus 70, and FIG. 9 is a plan view, with portions broken away, of the apparatus 70. The lubricant application apparatus 70 is constituted by a stationary unit 80 secured to the mounting member 74 and a movable unit 100 slidably movable with respect to the stationary unit 80.

The stationary unit 80 has a base stand 81, having a U-shape section, and secured to the mounting member 74. A base portion 82*a* of a bolt support member 82 for supporting a lever operating bolt 83, is fixed at the innermost part of a bottom plate 81*a* of the base stand 81 (at the left hand in each of FIGS. 8 and 9). The bolt support member 82 is made in an inverted L shape as standing at the right hand of the apparatus 70 (at an upper side in FIG. 9) and then turned toward the front side of the apparatus 70. The tip portion 82*b* is turned inwardly of the apparatus 70 substantially at a right angle and provided in the vicinity of the end thereof with a threaded hole in which the lever operating bolt 83 is threadedly connected.

Further, the stationary unit 80 has a drive mechanism 84 for generating a drive force for slidably moving the movable unit 100. The drive mechanism 84 is constituted by a pair of pulleys 85 and 86, a timing belt 87 wound on the pulleys 85 and 86, and a motor 88. The motor 88 is attached to the base stand 81 through a motor mounting plate 89. A worm gear 90 fixed to the output shaft of the motor 88 is meshed with a gear 91. The gear 91 and the pulley 85 are fixed to a shaft 92. This causes the rotary force of the motor 88 to be transmitted to the timing belt 87 through the gears 90 and 91, the shaft 92, and the pulley 85. The pulley 86 follows the timing belt 87. The shaft to which the pulley 86 is fixed, is rotatably supported between a lateral plate 81*b* of the base stand 81 and a support member 93 fixed to the bottom plate 81*a* of the base stand 81. The shaft 92 to which the pulley 85 and the gear 91 are fixed, is rotatably supported by the bolt support member 82 and a support member 94 secured to the motor mounting plate 89.

In the timing belt 87, an engaging member 95 for engaging the movable unit 100 with the timing belt 87, is fixed with a pair of bolts 96.

Figure 10:
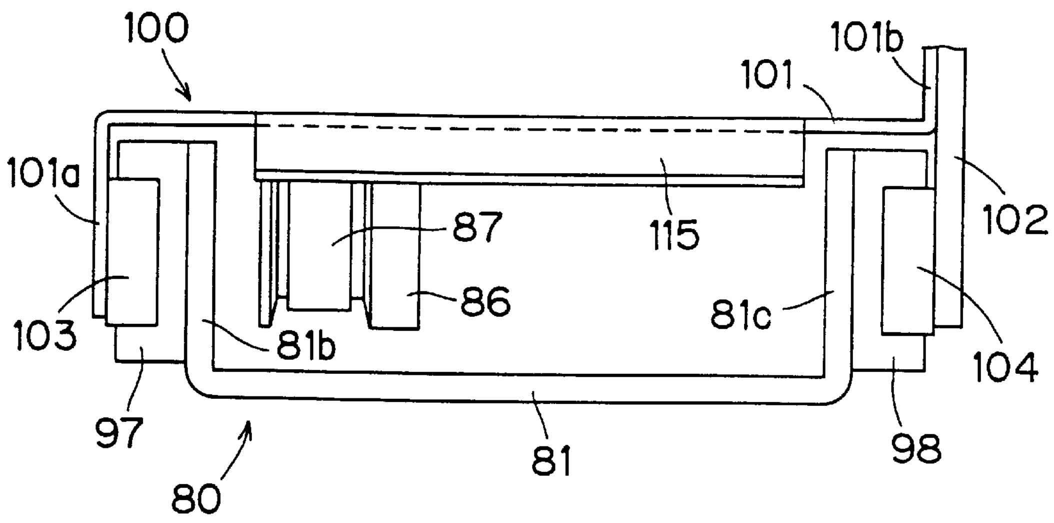
FIG. 10 is a front view of the slide mechanism for sliding the movable unit with respect to the stationary unit in the lubricant application apparatus.

As shown in FIG. 10, the movable unit 100 has a slide bed plate 101 to be slid as guided by a pair of rails 97 and 98 which are respectively fixed to the outsides of the lateral plates 81*b* and 81*c* of the base stand 81 of the stationary unit 80. The slide bed plate 101 is engaged with the timing belt 87 by the engaging member 95. Accordingly, by rotating the motor 88 to move the timing belt 87, the slide bed plate 101 is slid as guided by the rails 97 and 98.

The slide bed plate 101 is provided at the left lateral side thereof with a descending portion 101*a* which is downwardly turned, and at the right lateral side thereof with an ascending portion 101*b* which is upwardly turned. A lateral side plate 102 is fixed to the ascending portion 101*b*. A pair of rollers 103 and 104 are respectively attached to the descending portion 101*a* of the slide bed plate 101 and the lateral side plate 102. The rollers 103 and 104 are respectively engaged with the rails 97 and 98 respectively fixed to the lateral plates 81*b* and 81*c* of the base stand 81 such that the slide bed plate 101 is smoothly slid.

Disposed above the slide bed plate 101 is a bottle housing portion 106 for housing a bottle 105 which contains a lubricant to be applied to the surface of the gravure cylinder C. The bottle housing portion 106 is fixed to the lateral side plate 102 and has a substantially L-shape section. The bottle housing portion 106 is provided at the front end of a bottom plate 106*a* thereof with a bottle head mounting portion 106*b* which stands upwardly and then extends forwardly. Using a pair of bolts 108 or the like, a bottle head 107 secured to a cap 105*a* of the bottle 105 is fixed to the bottle head mounting portion 106*b*.

A roll housing portion 110 is formed behind the bottle housing portion 106. Housed in the roll housing portion 110 is band-like paper for spreading or wiping off a lubricant applied onto the surface of the gravure cylinder C. The paper is housed as wound in the form of a roll. An unused portion of the paper is reeled out from a feed roll 111 (not shown in FIG. 9), and then introduced, as guided by the bottom of the bottle housing portion 106, to (i) a spreading roller 113 which is disposed under the bottle head 107 and serves as a contact device, and (ii) a roller 114. A used portion of the paper is guided from the roller 114 by a tongue piece 115 formed at the front edge of the slide bed plate 101, then passes through the space between the bottle housing portion 106 and the slide bed plate 101, and is introduced to a takeup roll 112. The portion of the paper on the spreading roller 113 serves as a contact portion to come in contact with the gravure cylinder C.

The feed roll 111 is held by a pair of roll holding members 121 and 122. Each of the roll holding members 121 and 122 has a shape in which a column-like portion is integrally provided at one end thereof with a truncated cone. Using a bolt 124, one roll holding member 121 is fixed to an L-shape mounting plate 123 having a reverse L shape in plan elevation. The L-shape mounting plate 123 is fixed to the lateral side plate 102. The other roll holding member 122 is fixed to a leaf spring member 125 secured to the tip of the L-shape mounting plate 123. The spring force of the leaf spring member 125 causes the feed roll 111 to be rotatably held between the roll holding members 121 and 122. When the roll holding member 122 is displaced, against the spring force of the leaf spring member 125, in a direction away from the roll holding member 121, the distance between the roll holding members 121 and 122 can be widened. This enables the feed roll 111 to be replaced.

The takeup roll 112 is held by a roll holding member 127 made substantially in the form of a square pole. The roll holding member 127 has, at its center, a shaft 128. The roll holding member 127 is provided in one end thereof with an annular recessed portion 127*a* hollowed out around the shaft 128. Housed in the concave portion 127*a* is a portion of a coil spring 130 put on the shaft 128. The coil spring 130 biases a bearing 131, which is slidably fitted on the shaft 128 at one end thereof, in a direction away from the roll holding member 127. The shaft 128 is provided at the tip thereof with a falling-off prevention metal fitting 132 (See FIG. 9) for preventing the bearing 131 from falling off from the shaft 128. The shaft 128 is inserted in a U-shape notch in a bearing support plate 134. By pushing the bearing 131 to the edge of the notch in the bearing support plate 134 by the coil spring 130, the shaft 128 is rotatably supported. The shaft 128 is arranged such that its end at the side of the bearing support plate 134 can be raised. This enables the takeup roll 112 to be replaced.

At the side of the lateral side plate 102 of the takeup roll 112, the shaft 128 is fixed to a movable portion 129*a* of a one-way clutch 129. A stationary portion 129*b* of the one-way clutch 129 is fixed to the lateral side plate 102. This one-way clutch 129 allows the roll holding member 127 which holds the takeup roll 112, to be rotated only clockwise in FIG. 8.

Figure 11A:
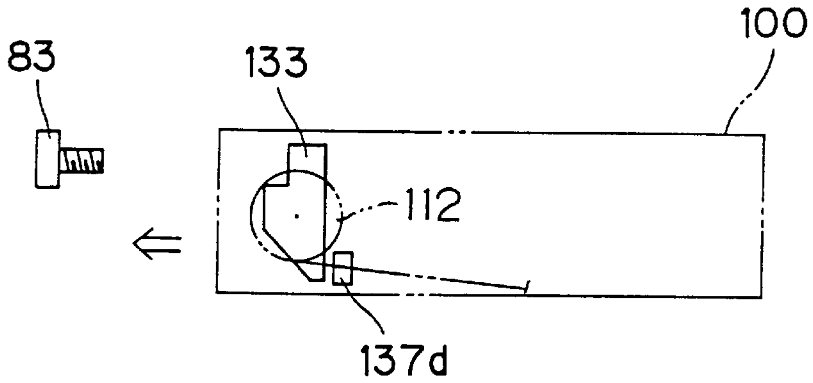
FIG. 11A and FIG. 11B are views schematically illustrating the relationship between the slide movement of the movable unit and the paper winding operation.
Figure 11B:
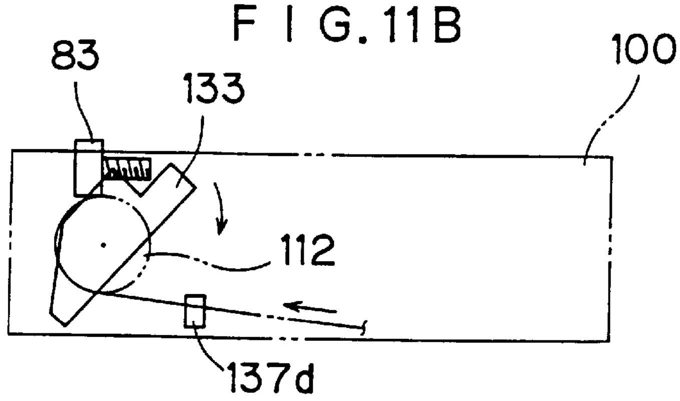

A takeup lever 133 is fixed to the movable portion 129*a* of the one-way clutch 129. As shown in FIG. 8, the takeup lever 133 is biased counterclockwise in FIG. 8 by a leaf spring 135 which is fixed to the slide bed plate 101. When the slide bed plate 101 is located in a retreat position schematically shown in FIG. 11B, the upper end of the takeup lever 133 comes in contact with the lever operating bolt 83. When, as schematically shown in FIG. 11A, the slide bed plate 101 is located in an advance position where the slide bed plate 101 has been advanced toward the gravure cylinder C, the takeup lever 133 does not come in contact with the lever operating bolt 83. At this time, the action of the leaf spring 135 causes the takeup lever 133 to be rotated counterclockwise to an extent more than that in FIG. 11B.

In the course of the movement of the slide bed plate 101 from the advance position (FIG. 11A) toward the retreat position (FIG. 11B), the upper end of the takeup lever 133 comes in contact with the lever operating bolt 83. As a result, the takeup lever 133 is rotated clockwise. At this time, the one-way clutch 129 transmits the rotation of the takeup lever 133 to the shaft 128. This causes the paper to be wound at its used portion on the takeup roll 112. When the slide bed plate 101 is advanced from the retreat position, the takeup lever 133 is rotated counterclockwise by the action of the leaf spring 135. However, the rotation of the takeup lever 133 is never transmitted to the shaft 128 by the one-way clutch 129. Accordingly, the takeup roll 112 only takes up paper and a used portion of the paper is never reeled out. The paper takeup amount can be adjusted by rotating the lever operating bolt 83 to change the projecting amount of the lever operating bolt 83 from the bolt support member 82.

Disposed under the feed roll 111 is a paper feed control member 137 serving as rotational amount regulating means for controlling the amount of paper fed from the feed roll 111 substantially constant. The paper feed control member 137 is rotatably supported by a shaft 138 fixed to the lateral side plate 102. The paper feed control member 137 is constituted by a base portion 137*a* extending along the lateral side plate 102, a roll contact portion 137*b* extending along the axis of the feed roll 111 and between the roll holding member 121 and the bottle housing portion 106, and a guide portion 137*c* extending along the axis of the feed roll 111 in the vicinity of the shaft 138. As shown in FIG. 9, a coil spring 139 is put on the shaft 138. The coil spring 139 has one end engaged with a lower portion of the paper feed control member 137, and the other end engaged with the lateral side plate 102. The coil spring 139 biases the paper feed control member 137 counterclockwise in FIG. 8. Thus, the roll contact portion 137*b* comes in contact with the surface of the feed roll 111. The guide portion 137*c* is arranged to guide a used portion of the paper to the takeup roll 112. Further, the paper feed control member 137 has a rotation regulating portion 137*d* above the shaft 138. This rotation regulating portion 137*d* regulates the counterclockwise rotation of the takeup lever 133 biased by the leaf spring 135.

The feed roll 111 is gradually decreased in diameter as an unused portion of the paper is reeled out and used. On the other hand, the takeup roll 112 is increased in diameter with the use of paper. The amount of a used paper portion wound on the takeup roll 112 is given by the product of the diameter of the takeup roll 112 and the amount of angular displacement in the clockwise direction of the takeup lever 133. The amount of a used paper portion wound on the takeup roll 112 is equal to the amount of an unused paper portion fed from the feed roll 111. Accordingly, if the amount of angular displacement of the takeup lever 133 at the time when the slide bed plate 101 is slid from the advance position to the retreat position, is constant, the feed amount of an unused paper portion is increased with an increase in diameter of the takeup roll 112. To prevent such an increase in the feed amount of an unused paper portion, the paper feed control member 137 is disposed.

Figure 12A:
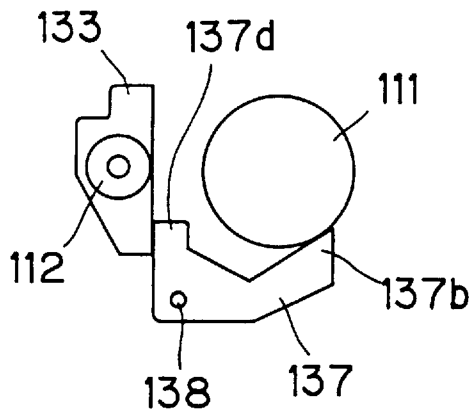
FIG. 12A and FIG. 12B are views schematically illustrating the operation of the paper feed control member in the lubricant application apparatus.
Figure 12B:
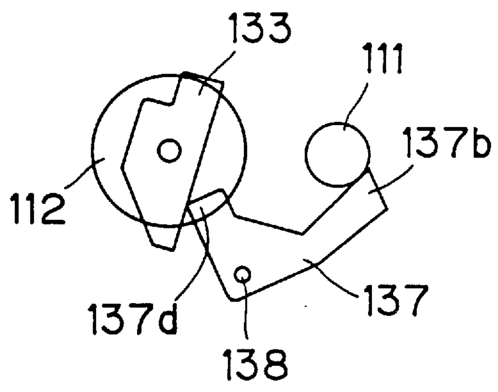

FIG. 12A and FIG. 12B schematically illustrate the operation of the paper feed control member 137. FIG. 12A shows the operation when the feed roll 111 is great in diameter, while FIG. 12B shows the operation when the feed roll 111 is small in diameter. The rotational position of the paper feed control member 137 is determined by the roll contact portion 137*b* arranged to come in contact with the feed roll 111. Therefore, as the feed roll 111 is decreased in diameter, the paper feed control member 137 is accordingly changed in rotational position in the counterclockwise direction in FIGS. 12A and 12B. The counterclockwise rotation of the paper feed control member 137 causes the position of the rotation regulating portion 137*d* to come closer to the axis of the takeup roll 112. As a result, the amount of angular displacement in the counterclockwise direction of the takeup lever 133 is decreased with a decrease in diameter of the feed roll 111. The amount of angular displacement in the counterclockwise direction of the takeup lever 133 at the time when the slide bed plate 101 advances, is equal to the amount of angular displacement in the clockwise direction of the takeup lever 133 at the time when the slide bed plate 101 retreats. Accordingly, the amount of angular displacement in the clockwise direction of the takeup lever 133 is decreased as the feed roll 111 is smaller in diameter. More specifically, the takeup angle of the takeup roll 112 during one reciprocal displacement of the slide bed plate 101 (rotational amount per stroke), is smaller as the feed roll 111 is smaller in diameter.

On the other hand, the diameter of the takeup roll 112 is increased with a decrease in diameter of the feed roll 111. Accordingly, while an unused portion of the paper is used as reeled out from the feed roll 111, the takeup roll 112 is increased in diameter and its takeup angle is decreased. As a result, the amount of an unused paper portion fed from the feed roll 111 is maintained substantially constant at all times.

Referring to FIG. 8, the description will discuss the arrangement of the bottle head 107 and the vicinity thereof. The bottle head 107 is provided in the vicinity of the center thereof with a lubricant passage 140 which communicates with a tube 141 introduced inside of the bottle 105. The tube 141 is provided on the outer peripheral surface thereof with a threaded portion. This threaded portion is threadedly connected to a nut 142 inside of the bottle cap 105*a,* thus attaching the bottle head 107 to the cap 105*a.* A needle stopper 145 is inserted in the tube 141 and the lubricant passage 140. The needle stopper 145 is provided at the base end thereof with a tapering portion arranged to come in contact with or separated from the tube 141. Further, the needle stopper 145 is provided at the tip thereof with an interlock bar 146. The interlock bar 146 is provided on the tip thereof with a threaded portion. This threaded portion is threadedly connected to a slide body 147 which is transversely movably fitted in the lubricant passage 140. The threaded portion of the interlock bar 146 comes in contact with an adjust screw 148. At the side of the tube 141, the slide body 147 has a recessed portion 149 in which housed is a portion of a compression coiled spring 150 put on the needle stopper 145. A resilient sheet 151 is attached to each of those surfaces of the slide body 147 and the bottle head 107 which face the gravure cylinder C.

The bottle head 107 is fixed to the bottle head mounting portion 106*b* by (i) tubular members 152 which vertically pass through the bottle head 107, (ii) bolts 153 which pass through the bottle head mounting portion 106*b* and which are threadedly connected to the tubular members 152, and (iii) the bolts 108 threadedly connected to the tubular members 152 from above.

The slide body 147 slightly projects from the bottle head 107. Its projecting amount is adjusted by the adjust screw 148. By the action of the compression coiled spring 150 put on the interlock bar 146, the slide body 147 is normally maintained as projecting. At this time, the needle stopper 145 comes in contact with the tube 141 to prevent the lubricant from flowing out.

When applying a lubricant to the surface of the gravure cylinder C, the movable unit 100 is advanced toward the gravure cylinder C. This causes the projecting slide body 147 to come in contact with the gravure cylinder C. Then, the slide body 147 is embedded inside of the bottle head 107. As a result, the lubricant in the bottle 105 is guided to the lubricant passage 140 through the gap between the needle stopper 145 and the tube 141, and then discharged to the gravure cylinder C through the gap between surface of the lubricant passage 140 and the slide body 147.

The spreading roller 113 and the roller 114 located under the bottle head 107 are rotatably held by shafts 155 and 156, respectively. The shafts 155 and 156 are supported by a pair of support pieces 158 held in a manner rotatable around a shaft 157. The shaft 157 is supported by a mounting plate 159 secured to the lateral side plate 102. A coil spring 160 serving as a biasing device is disposed between a pin 161 fixed to the mounting plate 159 and a hook member 162 projecting from one support piece 158. The coil spring 160 biases the support pieces 158 clockwise. This causes the spreading roller 113 to normally slightly project from the bottle head 107.

Figure 13A:
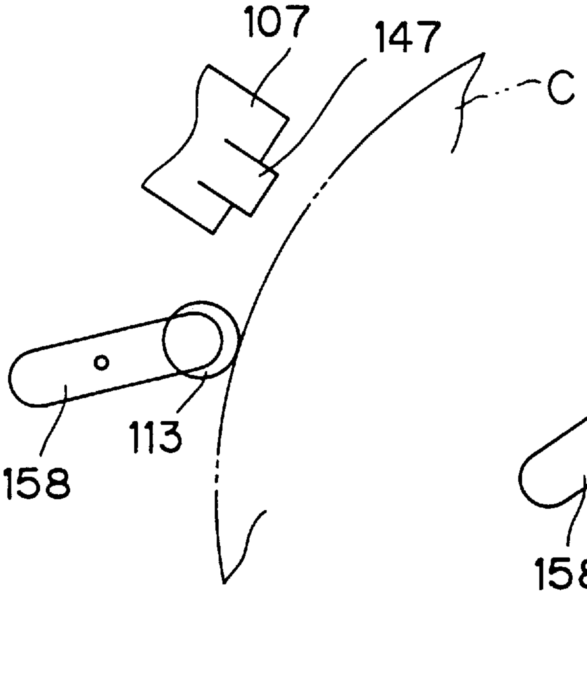
Figure 13B:
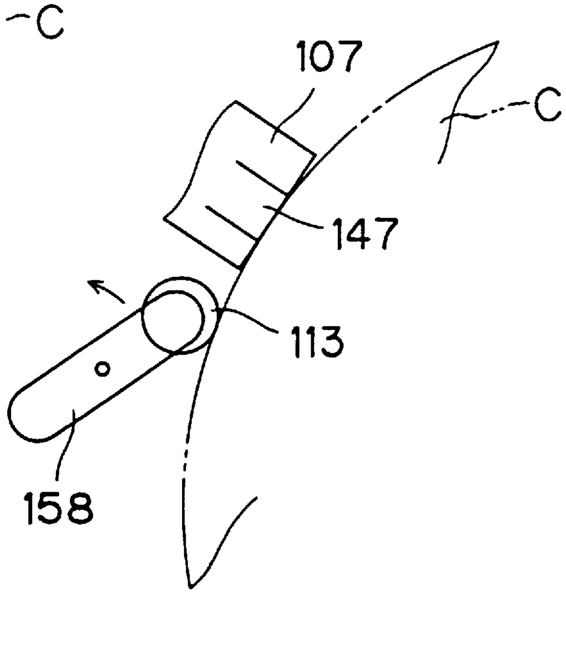

According to the arrangement above-mentioned, when the movable unit 100 is slidably displaced toward the gravure cylinder C, the spreading roller 113 first comes in contact with the gravure cylinder C as schematically shown in FIG. 13A. When the movable unit 100 is further advanced against the pull strength of the coil spring 160, the spreading roller 113 is relatively retreated with respect to the bottle head 107 and both the spreading roller 113 and the bottle head 107 come in contact with the gravure cylinder C as schematically shown in FIG. 13B. When the gravure cylinder C is under rotation, the lubricant discharged to the surface of the gravure cylinder C from the bottle head 107, is spread by the spreading roller 113. The movable unit 100 can be stopped at the state shown by FIG. 13A. This state is provided for wiping off a surplus lubricant after the lubricant has been applied to and spread on the gravure cylinder C.

Figure 14:
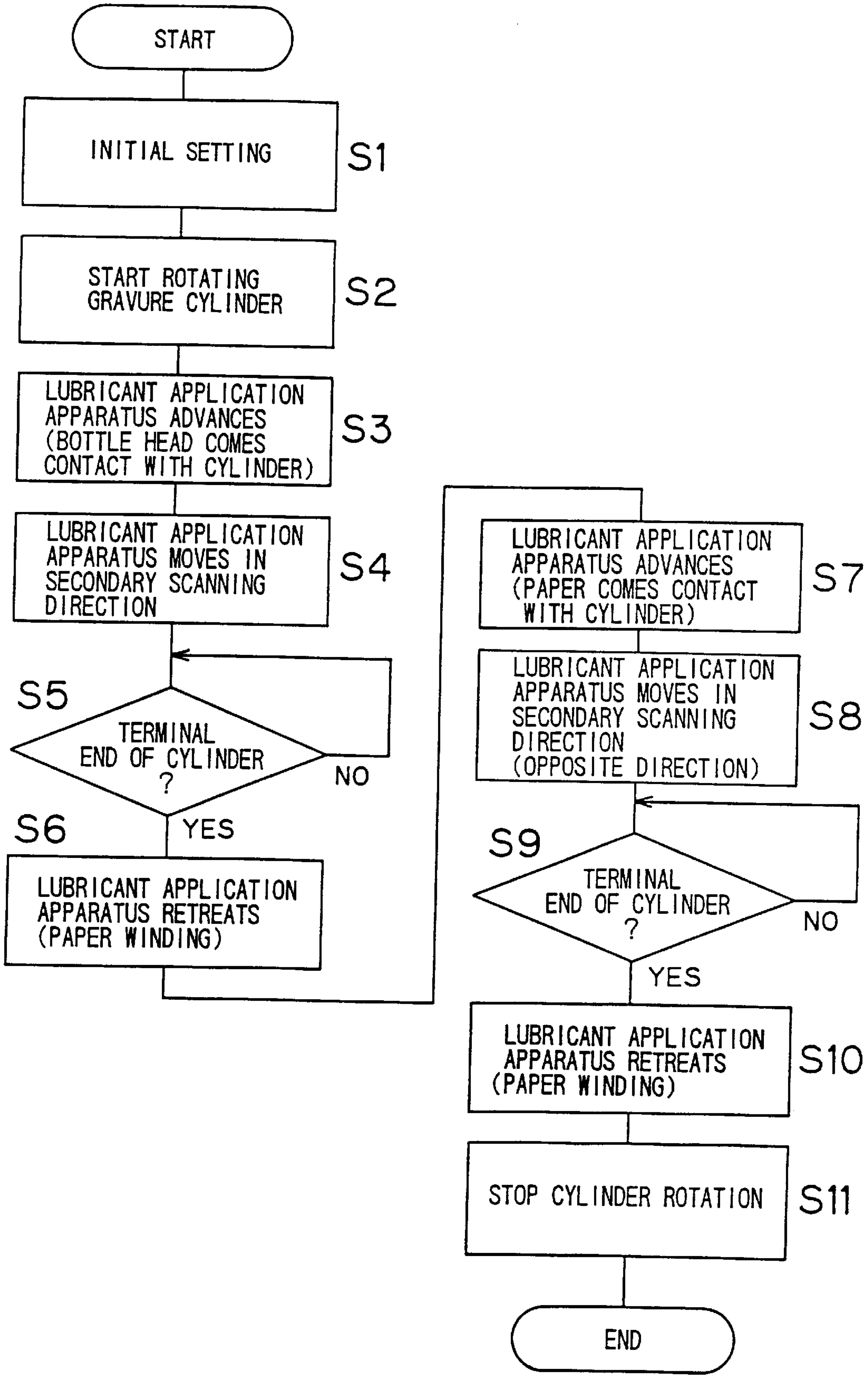
FIG. 14 is a flow chart illustrating the operation of the lubricant application apparatus.

FIG. 14 is a flow chart for illustrating the automatic lubricant application operation. First, there is executed an initial setting processing for making sure of the presence or absence of the gravure cylinder C or for making sure of the origin position of the engraving head 56 (Step S1). Then, the gravure cylinder C starts rotating (Step S2). At this time, the rotational speed of the gravure cylinder C is not required to be equal to the rotational speed thereof at the time of engraving, but is preferably set to a value suitable for the application of a lubricant.

Figure 15:
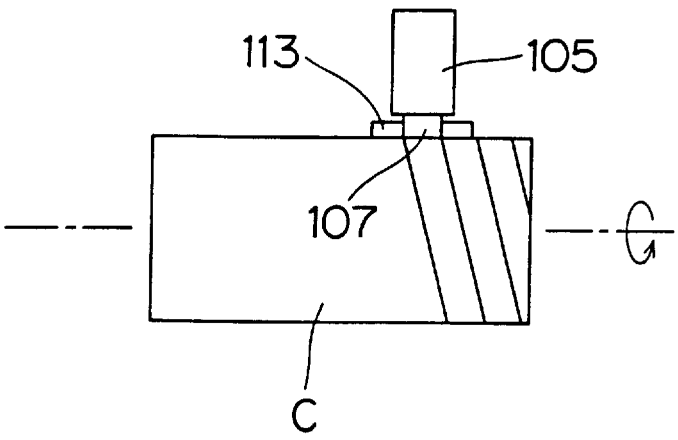
FIG. 15 is a view schematically illustrating how a lubricant is applied.

While the cylinder C is under rotation, the motor 88 of the drive mechanism 84 is rotated in one direction. Accordingly, the movable unit 100 of the lubricant application apparatus 70 advances and comes close to the cylinder C from obliquely above the cylinder C as shown in FIGS. 13A and 13B (Step S3). This causes the bottle head 107 and the spreading roller 113 to come in slide contact with the cylinder C. At this time, the spreading roller 113 pushes, to the cylinder C, paper wound on the spreading roller 113. Then, the counter-shaft motor 54 is energized, causing the engraving table 23 to be moved at a constant speed in the secondary scanning direction along the axis of the cylinder C (Step S4). Thus, as shown in FIG. 15, the surface of the cylinder C is spirally scanned by the bottle head 107 and the paper wound on the spreading roller 113. In the course of this scanning, the lubricant discharged from the bottle head 107 is spread on the surface of the cylinder C by the paper.

When the bottle head 107 has moved up to the terminal end of the cylinder C (Step S5), the drive mechanism 84 operates to retreat the movable unit 100 of the lubricant application apparatus 70 to the initial position (Step S6). This causes the takeup lever 133 to be rotated clockwise in FIG. 8 such that a predetermined amount of used paper portion is wound on the takeup roll 112. An unused portion of the paper is fed to the spreading roller 113, accordingly.

Then, the drive mechanism 84 operates to advance again the movable unit 100 of the lubricant application apparatus 70 toward the cylinder C (Step S7). This provides a state where only the paper wound on the spreading roller 113 is in contact with the cylinder C. That is, the bottle head 107 does not come in contact with the cylinder C.

Figure 16:
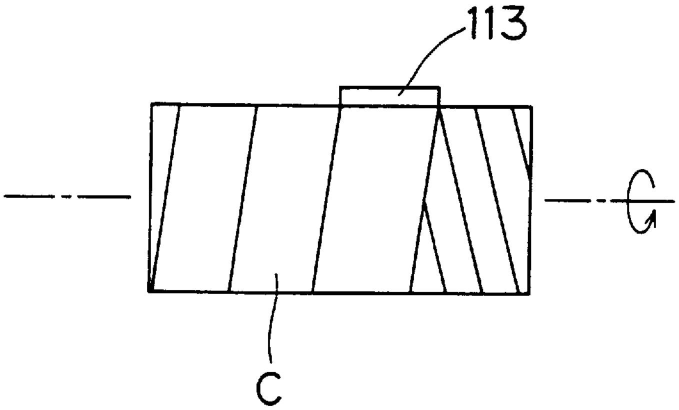
FIG. 16 is a view schematically illustrating how a surplus lubricant is wiped off.

At this state, the engraving table 23 is driven in the direction opposite to the direction in which the engraving table 23 is driven at the time of lubricant application at Step S4 (Step S8). This causes the paper wound on the spreading roller 113 to spirally scan the cylinder C to wipe off a surplus lubricant as shown in FIG. 16.

When the spreading roller 113 reaches the terminal end position of the cylinder C (Step S9), the drive mechanism 84 retreats the movable unit 100 to the initial position (Step S10). At this time, a predetermined amount of a used portion of the paper is wound on the takeup roll 112, and an unused portion of the paper is fed to the spreading roller 113. Then, the rotation of the cylinder C is stopped (Step S11) to finish the lubricant application operation. When engraving the cylinder C immediately after the application of a lubricant, the engraving processing may be started without the rotation of the cylinder C stopped.

At the engraving processing, the cylinder C is rotated at a constant speed while the stylus 62 is vibrated at constant frequency. The amplitude of the stylus 62 varies with an image signal. As a result, cells having a variety of sizes are formed in the surface of the gravure cylinder C. During this engraving processing, the sliding shoe 61 put side by side with the stylus 62 is in slide contact with the surface of the cylinder C to maintain the distance between the engraving head 56 and the surface of the cylinder C at a predetermined value. Since the lubricant has been applied to the surface of the cylinder C, the sliding shoe 61 can smoothly slide on the surface of the cylinder C even after burrs have been generated thereon by engraving.

As discussed in the foregoing, according to the embodiment above-mentioned, a lubricant can automatically be applied by the lubricant application apparatus 70 attached to the engraving table 23. This eliminates a lubricant application processing that used to be manually executed by the operator. Further, to attain the automation of engraving of plural gravure cylinders by automating the replacement of the gravure cylinders, the lubricant application processing can also be automated. Thus, a full automatic operation can be achieved.

Further, according to this embodiment, while the surface of the cylinder C is spirally scanned, a lubricant is applied, spread and wiped off by moving the lubricant application apparatus 70 axially of the cylinder C. In this connection, the lubricant application apparatus 70 can be used for cylinders having a variety of shaft lengths by controlling the amount of axial movement of the apparatus 70.

Further, to move the lubricant application apparatus 70 axially of the cylinder C, this embodiment utilizes the drive mechanism of the engraving table 23 existing in a gravure engraving machine. Thus, automatic application of a lubricant can be achieved using a relatively economical arrangement.

Further, the embodiment above-mentioned is arranged such that, with an increase in diameter of the takeup roll 112, there is decreased the amount of angular displacement of the takeup roll 112 at the time of paper winding. Accordingly, a substantially fixed amount of an unused portion of the paper is reeled out at all times. Thus, spreading a lubricant and wiping off a surplus lubricant can securely be conducted using an unused portion of the paper and no paper is used wastefully.

Further, when the movable unit 100 is retreated from the advance position and returned back to the initial position, the takeup roll 112 is rotated in the winding direction in association with such a slide displacement of the movable unit 100. This eliminates a special drive device for winding a used portion of the paper.

Further, the movable unit 100 can take two positions, i.e., a position where both the bottle head 107 and the spreading paper come in contact with the surface of the cylinder C and a position where only wiping paper comes in contact with the cylinder C. This enables the single drive mechanism 84 to apply and spread a lubricant and wipe off a surplus lubricant.

The present invention is not limited to the embodiment discussed in the foregoing. In the embodiment above-mentioned, after a lubricant has been applied, a surplus lubricant is wiped off. However, such wiping off a surplus lubricant may be omitted. In the embodiment above-mentioned, application, spreading and wiping-off of a lubricant are conducted during one reciprocal motion of the lubricant application apparatus 70 in the axial direction of the cylinder C. However, such processings may be executed in a period of time longer than the time required for one reciprocal motion of the lubricant application apparatus 70, i.e., one and a half or two reciprocal motions.

In the embodiment above-mentioned, paper is used as a sheet member for spreading a lubricant, but another moisture absorbing sheet member such as cloth may also be used.

The present invention has been discussed in detail with reference to an embodiment. However, the foregoing embodiment is a mere illustrative example for disclosing the technical nature of the present invention, and the present invention should not be interpreted by limiting to this practical example only. Hence, the true spirit and scope of the present invention should be limited only by of the accompanying claims.

I claim:

1. An apparatus for applying a lubricant to a gravure cylinder set in a gravure engraving machine, the gravure engraving machine having a rotational drive mechanism for rotating the gravure cylinder around an axis thereof, said apparatus comprising:

a discharging device for discharging a lubricant to a surface of the gravure cylinder;

a spreading device having a contact portion to come in contact with the gravure cylinder for spreading the discharged lubricant on the surface of the gravure cylinder;

a drive mechanism for displacing said discharging device and said spreading device toward and away from the gravure cylinder; and another mechanism for moving said discharging device and said spreading device axially of the gravure cylinder.

2. A lubricant application apparatus according to claim 1, wherein said spreading device includes:

a sheet member that is housed as it is wound on a feed roll;

a contact mechanism for bringing a pulled-out portion of the sheet member into contact with the surface of the gravure cylinder; and a takeup for winding a used portion of the sheet member.

3. A lubricant application apparatus according to claim 2, wherein said takeup includes:

a holding member for holding a takeup roll for winding a used portion of the sheet member thereon; and a takeup mechanism for rotating said holding member in a winding direction in association with the drive of said discharging means and said spreading means by said drive means.

4. A lubricant application apparatus according to claim 3, wherein:

said drive mechanism includes a movable unit which is movable toward and away from the gravure cylinder and which holds said discharging device and said spreading device; and said takeup mechanism is arranged to rotate said holding member each stroke during which said movable unit is moved toward and then away from the gravure cylinder.

5. A lubricant application apparatus according to claim 4, wherein said takeup mechanism includes a rotational regulator for reducing rotation of said holding member during the stroke, according to a decrease in diameter of said feed roll.

6. A lubricant application apparatus according to claim 5, wherein:

said takeup mechanism includes: a takeup lever connected to said holding member through a one-way clutch such that only a rotation thereof in the winding direction is transmitted to said holding member; and a takeup lever drive for swinging said takeup lever during one stroke during which said movable unit of said drive mechanism is moved toward and away from the gravure cylinder; and said rotational regulator includes a sheet feed control member, including a roll contact portion to come in contact with said feed roll and a rotation regulating portion to come in contact with said takeup lever, for regulating the swing width of said takeup lever according to the diameter of said feed roll, said sheet feed control member being rotatable around an axis substantially parallel with an axis of said feed roll.

7. A lubricant application apparatus according to claim 4, wherein said takeup mechanism includes:

a takeup lever connected to said holding member through a one-way clutch such that only a rotation thereof in a winding direction is transmitted to said holding member; and a takeup lever drive for swinging said takeup lever during one stroke during which said movable unit of said drive means is moved toward and away from the gravure cylinder.

8. A lubricant application apparatus according to claim 1, wherein said discharging device and said spreading device are integrally displaced by said drive mechanism;

said discharging device includes a head portion to come in contact with the gravure cylinder;

said contact portion of said spreading device is finely movable toward and away from the gravure cylinder;

said spreading device includes bias device for resiliently biasing said contact portion such that said contact portion is located in a position nearer to the gravure cylinder than said head portion of said discharging device; and said drive mechanism is arranged to drive said discharging device and said spreading device to effect a plurality of states including a first state wherein either said head portion of said discharging device nor said contact portion of said spreading device is in contact with the gravure cylinder, a second state where said contact portion is in contact with the gravure cylinder while said head portion is not in contact with the gravure cylinder, and a third state where said contact portion is pushed, against the resilient force of said bias device, by the gravure cylinder such that both said contact portion and said head portion are in contact with the gravure cylinder.

9. A lubricant application apparatus according to claim 1 wherein:

said gravure engraving machine comprises an engraving head for engraving the gravure cylinder and an engraving head moving mechanism for moving said engraving head axially of the gravure cylinder;

said lubricant application apparatus further comprises a support mechanism for integrally supporting said discharging device and said spreading device together with said engraving head; and said another mechanism constitutes said engraving head moving mechanism.

10. A gravure engraving machine, comprising:

an engraving head for engraving a gravure cylinder;

an engraving head moving mechanism for moving said engraving head axially of the gravure cylinder;

a rotational drive mechanism for rotating the gravure cylinder around an axis thereof;

a discharging device for discharging a lubricant to a surface of the gravure cylinder;

a spreading device having a contact portion to come in contact with the gravure cylinder for spreading discharged lubricant on the surface of the gravure cylinder;

a drive mechanism for displacing said discharging device and said spreading device toward and away from the gravure cylinder; and a support mechanism for integrally supporting said discharging device and said spreading device together with said engraving head.

11. A gravure engraving machine according to claim 10, wherein said spreading device includes:

a sheet member housed as it is wound on a feed roll;

contact means for bringing a pulled-out portion of the sheet member into contact with the surface of the gravure cylinder; and a takeup device for winding a used portion of the sheet member thereon.

12. A gravure engraving machine according to claim 10, wherein:

said discharging device and said spreading device are integrally displaced by said drive means;

said discharging device includes a head portion to come in contact with the gravure cylinder;

said contact portion of said spreading device is finely movable toward and away from the gravure cylinder;

said spreading device includes a bias device for resiliently biasing said contact portion such that said contact portion is located in a position closer to the gravure cylinder than said head portion of said discharging means; and said drive mechanism is arranged to drive said discharging device and said spreading device to effect a plurality of states including a first state wherein neither said head portion of said discharging device nor said contact portion of said spreading device is in contact with the gravure cylinder, a second state wherein said contact portion is in contact with the gravure cylinder and said head portion is not in contact with the gravure cylinder, and a third state wherein said contact portion is pushed, against the resilient force of said bias device, by the gravure cylinder such that both said contact portion and said head portion are in contact with the gravure cylinder.

13. A method of applying a lubricant to a gravure cylinder set in a gravure engraving machine, the gravure engraving machine having a rotational drive mechanism for rotating the gravure cylinder around an axis thereof, said method comprising:

a first step of energizing said rotational drive mechanism to rotate the gravure cylinder;

a second step of discharging a lubricant from a lubricant discharging device to a surface of a gravure cylinder;

a third step of spreading discharged lubricant on the surface of the gravure cylinder by a spreading device; and a fourth step of moving said discharging device and said spreading device axially of the gravure cylinder.

14. A method according to claim 13, wherein said second and third steps includes controlling a drive mechanism for displacing the lubricant discharging device and the spreading device toward and away from the gravure cylinder such that both a head portion of the lubricant discharging device and a contact portion of the spreading device come in contact with the gravure cylinder.

15. A method according to claim 13, further comprising:

a fifth step of bringing a wiping device into contact with the surface of the gravure cylinder while the gravure cylinder is under rotation; and a sixth step of moving said wiping device axially of the gravure cylinder.

16. A method according to claim 15, further comprising, before said fifth step of bringing the wiping device into contact with the surface of the gravure cylinder, another step of withdrawing the lubricant discharging device from the surface of the gravure cylinder.

17. A method according to claim 15, wherein:

the spreading device and the wiping device share an arrangement comprising a sheet member housed as it is wound on a feed roll, contact means for bringing a pulled-out portion of the sheet member into contact with the surface of the gravure cylinder, and a takeup device for winding a used portion of the sheet member; and said fifth step of bringing the wiping device into contact with the surface of the gravure cylinder includes utilizing the takeup device to wind a used portion of the sheet member in a manner such that an unused portion of the sheet member comes in contact with the surface of the gravure cylinder.

* * * * *